(12) United States Patent
Wuollet et al.

(10) Patent No.: US 7,213,616 B2
(45) Date of Patent: May 8, 2007

(54) DIVERSION VALVE FLUID COUPLING

(75) Inventors: Charles Dean Wuollet, Rockford, MN (US); Shawn David Ellis, Golden Valley, MN (US); Paul Edward LeMay, Shoreview, MN (US); Brian Keith Foner, Bloomington, MN (US)

(73) Assignee: Parker-Hannifin, Cleveland, OH (US)

( * ) Notice: Subject to any disclaimer, the term of this patent is extended or adjusted under 35 U.S.C. 154(b) by 152 days.

(21) Appl. No.: 10/916,003

(22) Filed: Aug. 11, 2004

(65) Prior Publication Data

US 2005/0072479 A1 Apr. 7, 2005

Related U.S. Application Data

(60) Provisional application No. 60/499,494, filed on Sep. 2, 2003.

(51) Int. Cl.
*F16K 1/00* (2006.01)

(52) U.S. Cl. .............. 137/625.48; 137/882; 137/872; 137/871; 251/149.6

(58) Field of Classification Search .......... 137/625.48, 137/798, 882, 887, 877, 872, 871; 251/149.6; 62/299, 292
See application file for complete search history.

(56) References Cited

U.S. PATENT DOCUMENTS

| 3,441,054 A | 4/1969 | Mellan |
| 3,559,670 A | 2/1971 | Yedidiah |
| 3,658,290 A | 4/1972 | Peters et al. |
| 4,538,646 A | 9/1985 | Yang |
| 5,147,333 A | 9/1992 | Raines |
| 5,560,548 A | 10/1996 | Mueller et al. |
| 5,624,073 A * | 4/1997 | Mueller et al. .............. 239/442 |
| 6,073,300 A * | 6/2000 | Zahuranec et al. ........... 15/320 |
| 6,273,397 B1 | 8/2001 | Schultz et al. |
| 6,704,946 B1 * | 3/2004 | Mueller et al. .............. 4/420.4 |

* cited by examiner

*Primary Examiner*—Eric Keasel
*Assistant Examiner*—Craig Schneider
(74) *Attorney, Agent, or Firm*—Daniel J Whitman; Joseph J. Pophal (57) ABSTRACT

A diversion valve fluid coupling, permitting alternate flows in first and second operating positions, including a valve housing with inlet, first and second outlet ports; a quick disconnect coupling attached to the second outlet port and a seal interposed therebetween; a movable diverter valve assembly, having interconnected actuating and opposing valves; the actuating valve, in the first operating position, having a first sealing engagement with the seal; the opposing valve, in the second operating position, having a second sealing engagement with a first outlet port; a biasing member, biasing the diverter valve into the first sealing engagement, blocking the second outlet port while permitting flow to the first outlet port; and, for the second operating position, a nipple member, removably mating with the quick disconnect coupling and translating the diverter valve into the second sealing engagement, blocking the first outlet port while permitting flow into the second outlet port.

5 Claims, 6 Drawing Sheets

DIVERSION VALVE FLUID COUPLING

CROSS-REFERENCE TO RELATED CASES

The present application claims the benefit of the filing date of U.S. Provisional Application Ser. No. 60/499,494 filed Sep. 2, 2003, the disclosure of which is incorporated herein by reference.

FIELD OF THE INVENTION

The present invention pertains to diversion valve fluid couplings that permit alternate fluid flows in first and second operating positions. More particularly, the several embodiments of this invention pertain to diversion valve fluid couplings wherein axially movable diverter valve assemblies, having operatively interconnected actuating and opposing valve assemblies located within housing central cavities. The actuating valve assemblies, are adapted in first operating positions, for first sealing engagements with static seals at second outlet ports, with the opposing valve assemblies being adapted, in second sealing positions, for second sealing engagements with first outlet ports. A biasing member serves to bias the diverter valve assemblies into the first sealing engagements, thus blocking the second outlet ports and opening the first outlet ports. A removable nipple member, upon full insertion thereof, axially abuts and translates the diverter valve assemblies into the second sealing engagements, thereby blocking the first outlet ports and opening the second outlet ports.

BACKGROUND OF THE INVENTION

Diversion valve fluid couplings are well known in the art and are utilized for many diverse fluid handling applications and flow control systems ranging from shower plumbing systems, faucet and rinsing applications, as well as flow-rate dependent systems and the like, for both industrial and consumer applications. Generally, these systems utilize a single inlet port from which fluid flow can be diverted to alternate outlet ports, depending upon the desired end use. One of the applications, among others, for the diversion valve fluid couplings of the present invention, for example, is in the field of carpet cleaning machines. Such machines normally have two operating modes, namely normal operation during which the cleaning solution travels down to the main cleaning head where it is sprayed into the carpet in a known manner, and attachment operation where the cleaning solution is supplied to hand-held attachments for cleaning furniture upholstery, stairs, and the like.

When the hand-held attachments are utilized, the cleaning solution is supplied to the attachment via a standard quick disconnect coupling. Thus, on current machines of this type, the user must first disconnect the quick disconnect coupling that supplies the cleaning solution to the main carpet cleaning head, during normal operation, and then reconnect the same quick disconnect coupling to the hand-held attachment. When switching back to normal operation, the previous procedure must be reversed, i.e., the user must first disconnect the quick disconnect coupling from the hand-held attachment and then, secondly remember to again reconnect the quick disconnect coupling to the main cleaning head. This can, at times, be perplexing to the non-technical user.

The several embodiments of the present invention greatly simplify this process for the end user/consumer who now only has to connect the fluid line for the hand-held attachment, via the quick disconnect coupling. The diverter valve will automatically shut off the fluid flow to the main cleaning head and divert same to the hand-held attachment. Upon completion of the work with the hand-held attachment, the user simply disconnects the fluid line for the hand-held attachment, via the quick disconnect coupling, and the diverter valve automatically returns the fluid flow to the main cleaning head, thereby returning the machine to normal operation status.

The patent literature includes a large number of diverter valve constructions and the patents listed below are merely representative of the prior art and are listed in chronological order as follows: U.S. Pat. No. 3,441,054 to Mellan; U.S. Pat. No. 3,559,670 to Yedidiah; U.S. Pat. No. 3,658,290 to Peters et al.; U.S. Pat. No. 4,538,646 to Yang; U.S. Pat. No. 5,147,333 to Raines; U.S. Pat. No. 5,560,548 to Mueller et al; and U.S. Pat. No. 6,273,397 to Schultz et al. Two of these constructions will be discussed in more detail as follows:

Turning first to U.S. Pat. No. 3,441,054 to Mellan, this construction uses a single piece diverter valve construction, whereas the current invention utilizes a diverter valve assembly having operatively interconnected actuating and opposing valve assemblies. The single '054 valve forms both the port seal when the nipple is not connected, and then also forms the diversion seal (closing off the flow to the shower head) when the nipple is connected. The diverter valve assembly used in the present invention uses one valve to form the port seal and the other valve to form the diversion seal. In addition, the '054 valve is constructed of a rigid core having an elastomer material molded around this core to provide a sealing means. The present invention utilizes two operatively interconnected valve assemblies, with the first valve assembly being rigidly constructed and having an elastomer seal on one end. This elastomer seal seals against a valve seat that is diverting the flow from one outlet port to another outlet port. The second valve assembly is rigidly constructed without an elastomer seal but rather seals against a static elastomer seal retained in the body of the housing, with this second valve assembly forming the port seal. One of the essential parameters for the application of the diverter valve fluid couplings of the present invention is that they work with a variety of standard industrial pneumatic nipple geometries. Since manufacturers that will utilize the diverter valve fluid couplings of this invention already have multitudes of equipment out in the field that utilize such standard industrial nipples, it was therefore essential that the diverter valve fluid couplings of this invention accommodate the noted nipple geometries in their functions. In contrast thereto, the prior art '054 construction requires the use of a special nose geometry to act against a second biasing spring located within the single piece diverter valve.

Turning now to prior art U.S. Pat. No. 5,560,548 to Mueller et al., the diverter valve thereof, in all drawing figures, is of a single piece construction. The diverter valve assembly of the present invention is comprised of operatively interconnected valve assemblies, each assembly performing a different sealing function. The '548 valve seals in an ID/OD fashion in both positions, whereas in the present invention sealing is accomplished via a seal being spring biased against a valve seat, this being the case in both valve assemblies. ID/OD sealing methods, such as used in the '548 construction, tend to result in valves that stick when held in one position for extended periods of time. Thus, this prior art valve may stick in the open position when the nipple is disconnected. The diversion valve fluid couplings of the present invention, e.g., the construction depicted in FIGS. 2, 2a, 2b, 2c thereof, seal against a valve seat or are butted up against a seal, and thus are not likely to stick when left in one position for an extended period of time.

None of the constructions, set forth in the noted prior art patents, utilize movable diverter valve assemblies having the operatively interconnected activating and opposing valves of the present invention.

SUMMARY OF THE INVENTION

Accordingly, in order to overcome the deficiencies of the prior art devices, the several embodiments of the present invention provide improved diversion valve fluid couplings that while minimizing space requirements also reduces the associated manufacturing costs and simplifying the overall structures.

Specifically, in terms of structure, in this invention, a generic diversion valve fluid coupling, for permitting alternate fluid flow operating positions, comprises in combination: a valve housing, having an inlet port portion and spaced first and second outlet port portions, all of the port portions being connected via a housing central cavity, the first outlet port portion including an annular valve seat; an annular quick disconnect coupling mechanism attached to the housing second outlet portion; an annular static elastomer seal member interposed between the housing second outlet portion and the quick disconnect coupling member; an axially movable diverter valve assembly, comprised of operatively interconnected actuating and opposing valve assemblies, located within the housing central cavity, the actuating valve assembly, being adapted, in a first operating position, for a first sealing engagement with an adjacent annular side portion of the static elastomer seal member; the opposing valve assembly, being adapted, in a second operating position, for a second sealing engagement with the first outlet port portion annular valve seat; a biasing member, located within one of the housing central cavity and the first outlet port portion, for biasing the diverter valve assembly into the first sealing engagement, thereby blocking the second outlet port portion and concomitantly permitting fluid flow only from the inlet port portion into and through the first outlet port portion in the first operating position; and for the second operating position, a removable nipple member, adapted for removably mating with the annular quick disconnect coupling member and, upon full insertion thereof, axially abutting and translating the diverter valve assembly, against the force of the biasing member, into the second sealing engagement, thereby blocking the first outlet port portion and concomitantly permitting fluid flow only from the inlet port portion into and through the second outlet port portion.

In one variation thereof, the actuating valve assembly includes: an intermediate disc portion; on one side of the disc portion, an adjoining reduced diameter, generally-cylindrical, hollow, abutment portion, having spaced, peripheral, relief areas for permitting fluid flow, from the housing central cavity, into the inside of the abutment portion, with the outside diameter of the abutment portion being sized for a freely sliding relationship relative to the inside diameter of the static elastomer seal member; and on an opposite side of the disc portion, a first piece of a connecting portion, the connecting portion being operatively interconnected with the opposing valve assembly.

In another variation thereof, the opposing valve assembly includes: on a side, facing the actuating valve assembly, a second piece of the connecting portion; a distal end portion, connected with the second piece of the connecting portion; and an elastomeric toroidal seal, carried by the distal end portion, adapted for forming the second sealing engagement with the first outlet portion annular valve seat.

In a first species of the diversion valve fluid couplings of this invention, the actuating and opposing valve assemblies are axially movable, relative to each other.

In one variation of this first species, the opposing valve assembly second piece of the connecting portion includes a generally tubular portion that slidably confines a distal end of the first piece of the connecting portion; the opposing valve assembly also including a further biasing member, located within the generally tubular second piece of the connecting portion, for biasing the connection portion first end distal portion axially away from the opposing valve.

In a second species of the diversion valve fluid coupling of this invention, the opposing valve assembly further includes: the second piece of the connecting portion is a continuation of the first piece of the connecting portion; the distal end portion further including a generally cylindrical, axial, hollow outer portion, having spaced, peripheral, relief areas for permitting fluid flow, from the housing central cavity, into the inside of the outer portion, with the outside diameter of the outer portion being sized for a freely sliding relationship relative to a peripherally adjacent portion of the first outlet port portion; and the biasing member, for biasing the diverter valve assembly into the first sealing engagement, being located within the first outlet port portion and biased against the distal end outer portion.

In one variation of this second species, the elastomeric toroidal seal forms a press-fit seal with a radially adjacent portion of the first outlet portion.

In a third species of the diversion valve fluid coupling of this invention, the opposing valve assembly further includes: the second piece of the connecting portion is a continuation of the first piece of the connecting portion; the second piece of the connecting portion merging into a generally-cylindrical, hollow, open-ended, central portion; the central portion subsequently merging into the distal end portion, the distal end portion being a reduced diameter outer portion of the central portion; the distal end reduced diameter portion carrying the elastomeric seal for forming the second sealing engagement with the first outlet port portion annular seat valve; the second piece of the connecting portion including a radial through bore, the radial through bore intersecting the generally-cylindrical hollow central portion for permitting fluid flow therefrom into the housing central cavity in the first operating position; and the biasing member, for biasing the diverter valve assembly into the first sealing engagement, being located within the housing central cavity and biased against the distal outer end portion.

In one variation of this third species, the diversion valve fluid coupling further includes: the housing central cavity also including a further valve seat, axially aligned with but of greater diameter and axially spaced from the first outlet port portion annular valve seat; and the opposing valve central portion carrying a further elastomeric toroidal seal, adapted for forming a sealing engagement with the central cavity valve seat, during the second sealing engagement.

In another variation of this third species, the valve seat and the further valve seat form line-contact seals with their corresponding toroidal seals.

In a fourth species of the diversion valve fluid coupling of this invention, the valve housing further includes: a generally rectangular mounting plate, substantially perpendicular to the housing central cavity and located at an end opposite from the housing second outlet portion; and a rear surface of the mounting plate being provided with at least one fitting, adapted for plugging the coupling into a corresponding aperture, for coupling mounting purposes, with the fitting preferably being a one-way fitting of the barbed prong type.

In a first variation of this fourth species, the valve housing further includes: a section of the first outlet port portion is integrally formed as a part of a front wall of the mounting plate and is perpendicular to the housing central cavity and fluidically connected therewith; and the inlet port portion extends perpendicularly outwardly from the central bore, is axially spaced from and generally parallel with the first outlet port portion, but angularly oppositely-directed, with the inlet port portion and the first outlet port portion both being generally cylindrical, hollow and peripherally-barbed.

Another variation of this fourth species further includes: the valve housing, axially-directed relative to the mounting plate, has a generally-cylindrical outer surface that merges, on one end, with the annular quick disconnect mechanism; another end of the housing cylindrical outer surface is structurally interconnected with the first outlet port portion via a first, generally triangularly-shaped, reinforcing rib; the another end of the housing cylindrical outer surface is structurally interconnected with the mounting plate front wall via at least one second, generally triangularly-shaped reinforcing rib; and the another end of the housing cylindrical outer surface is finally structurally interconnected with the inlet port portion via a third, generally triangularly-shaped reinforcing rib.

A further variation of this fourth species also includes: opposing, equally angularly-spaced second reinforcing ribs; the first, second and third reinforcing ribs are equally angularly spaced; substantially the entire housing is constructed of a thermoplastic material; the thermoplastic material being polypropylene.

In a further variation of the generic diversion valve fluid coupling of this invention, substantially the entire housing is constructed of a non-ferrous metal, with the non-ferrous metal being brass.

In the first species of the diversion valve fluid coupling, for permitting alternate fluid flow first and second operating positions, the coupling comprises: a valve housing, having an inlet port portion and spaced first and second outlet port portions, all of the port portions being connected via a housing central cavity, the first outlet port portion including an annular valve seat; an annular quick disconnect coupling mechanism attached to the housing second outlet potion; an annular static elastomer seal member interposed between the housing second outlet portion and the quick disconnect coupling member; an axially movable diverter valve assembly, comprised of operatively interconnected actuating and opposing valve assemblies, located within the housing central cavity, the actuating valve assembly, being adapted in the first operating position, for a first sealing engagement with an adjacent annular side portion of the static elastomer seal member; the opposing valve assembly being adapted in the second operating position, for a second sealing engagement with the first outlet port annular valve seat; a biasing member, located within the housing central cavity, for biasing the diverter valve assembly into the first sealing engagement, thereby blocking the second outlet port portion while, at the same time, permitting fluid flow only from the inlet port portion into and through the first outlet port portion; and for the second operating position, a removable nipple member, adapted for removably mating with the quick disconnect coupling member and, upon full insertion thereof, axially abutting and translating the diverter valve assembly, against the force of the biasing member, into the second sealing engagement, thereby blocking the first outlet port portion while, at the same time, permitting fluid flow only from the inlet port portion into and through the second outlet port portion.

In a variation of this first species: the actuating valve assembly includes an intermediate disc portion; on one side of the disc portion, an adjoining, reduced diameter, generally-cylindrical, hollow, abutment portion, having spaced, peripheral, relief areas for permitting fluid flow, from the housing central cavity, into the inside of the abutment portion, with the outside diameter of the abutment portion being sized for a freely sliding relationship relative to the inside diameter of the static elastomer seal member; and on an opposite the of the disc portion, a first piece of a connecting portion, the connecting portion being operatively, but yieldingly connected with the opposing valve assembly; and the opposing valve assembly includes, on a side facing the actuating valve assembly, a second piece of the connecting portion; a distal end portion, connected with the second piece of the connecting portion; and an elastomeric toroidal seal, carried on the distal end portion, for forming the second sealing engagement with the outlet portion annular valve seat.

In a final variation of this first species, the opposing valve assembly connecting portion second piece includes a generally tubular portion that slidably confines a distal end of the connecting portion first piece; the opposing valve assembly also including a further biasing member, located within the tubular portion, for biasing the connection first portion axially away from the opposing valve.

DETAILED DESCRIPTION OF THE INVENTION

Figure 1:
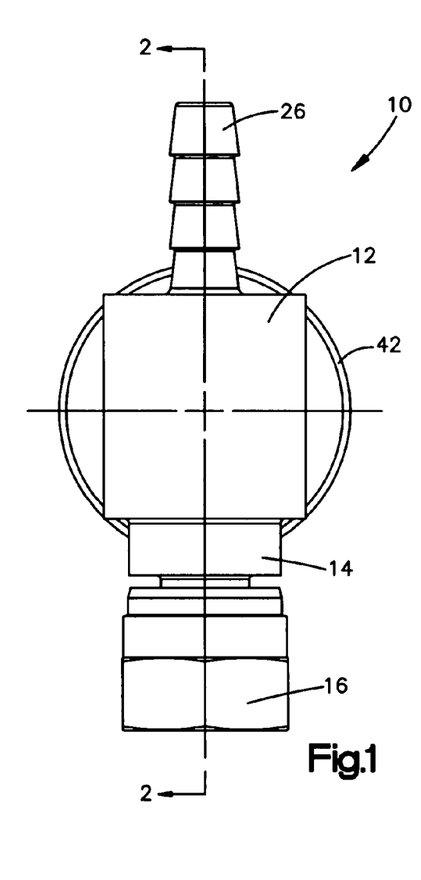
FIG. 1 is an end view of the closed end of a first embodiment of a diversion valve fluid coupling in accordance with this invention.
Figure 2:
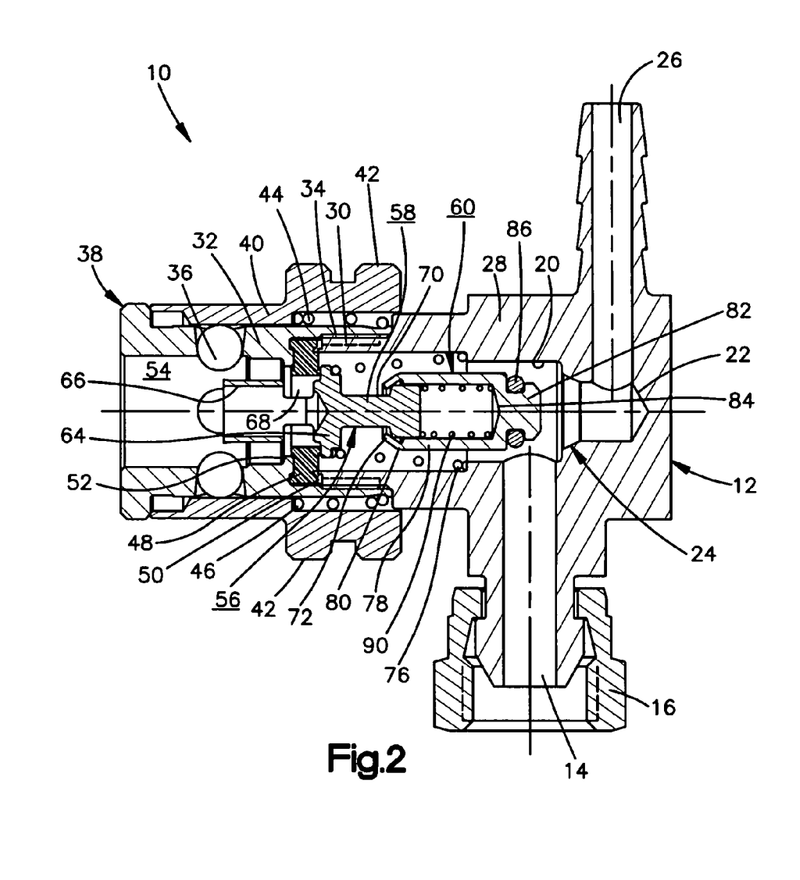
FIG. 2 is a longitudinal sectional view, taken along line 2—2 of FIG. 1.

Referring now to the several drawings, illustrated in FIGS. 1 and 2, is a first embodiment of a diversion valve fluid coupling, generally indicated at 10, with FIG. 1 showing coupling 10 in the normal operating position. Coupling 10, which preferably is fabricated mainly of metal, such as brass, includes an axial housing 12, of a generally cubic shape, having a radial, generally cylindrical inlet port portion 14 with an internally-threaded, rotatable female coupling member 16, the latter serving as a connector for mounting coupling 10 to a supply of pressurized fluid (not shown). Inlet port portion 14 extends radially, normally or perpendicularly outwardly from a multi-stepped cylindrical, central, internal, longitudinal body cavity or bore 20 and is axially spaced or separated, via an intermediately located valve seat portion 24, from a radially oppositely-extending, generally cylindrical, peripherally barbed first or normally-open outlet port 26. Housing 12 also includes a generally cylindrical, lateral portion 28 having an externally-threaded, open-ended, decreased diameter portion 30, in addition to an opposed, closed end 22.

Secured to housing portion 30, via a complementary threaded portion 34, is a quick disconnect tubular coupler or ball body 32 having a plurality of locking balls 36 in a manner well known in the art. Slidably journalled on coupler 32 is a tubular outer sleeve 40 that is normally-biased, via a spring 46, against a coupler end ring portion 38 and includes spaced, preferably knurled, manually-activated, actuating ring portions 42, again in a manner well known in the art. An annular recess 44, located inwardly of ring portions 42, permits the placement of previously-noted biasing spring 46. Thus, as will be explained in more detail later, outer sleeve 40 can be axially, manually displaced, over housing cylindrical portion 38, by overcoming the bias of spring 46. In addition, peripherally captured or retained between an inner end portion 48 of ball body 32 and an outer annular end 50 of threaded portion 30 is an elastic annular seal member 52. It should be understood at this time that housing bore 20, together with tubular ball body or quick disconnect coupler 32 and tubular outer sleeve 40, defines a second or normally-closed diverter outlet portion 54.

Yieldingly retained within stepped bore or body cavity 20 is a two piece valve assembly 56 comprised of two opposing valves, namely actuating or first valve assembly 58 and opposing or second valve assembly 60, both of which, as will be explained later, are axially movable relative to each other. Actuating valve assembly 58 is, in turn, comprised of a multi-stepped center disc portion 64; a generally cylindrical, hollow, outer portion 66, having opposed recess or cut-out sections/portions 68; and an axially-extending dual-diameter cylindrical portion 70, connected at a shoulder portion 72. The opposed steps of center disc portion 64 permit, on one side, sealing engagement with one side of annular elastic seal 52 and, on the opposing side, location of one end of an outer biasing spring 76 whose other end is received on a stepped shoulder in bore 20, with outer biasing spring 76 thus serving to normally bias actuating valve assembly 58 into a sealing relationship with seal 52.

Turning now to opposing valve assembly 60, its generally tubular, hollow, body 78 has an open end 80 thereof loosely retained, such as via crimping for example, so as to still permit axial relative movement therebetween, at actuating valve shoulder portion 72. Closed end 82 of tubular body 78 is provided with an inner end wall 84 and an outer toroidal seal member, such as an O-ring 86, the latter being adapted to seal against valve seat portion 24 in a diverter position to be described later. An inner biasing spring 90, interposed between inner end wall 84 and an annular outer end 74 of actuating valve assembly 58, normally biases opposite valve assembly 60 axially away from actuating valve assembly 58.

Figure 2A:
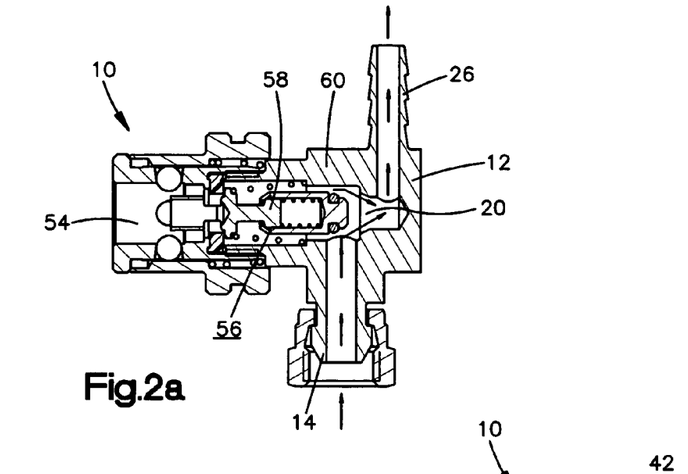
FIG. 2a is a view, substantially similar to that of FIG. 2 and illustrates the normal fluid flow direction of this fluid diverter coupling.
Figure 2B:
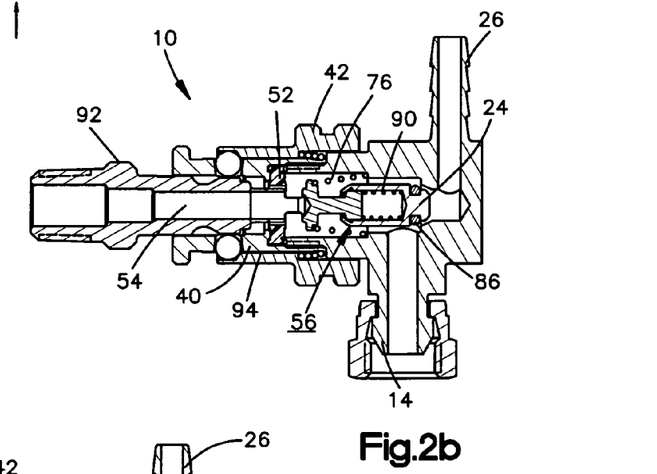
FIG. 2b illustrates the fluid diversion coupling of FIG. 2a upon the initiation of a fluid diversion connection.
Figure 2C:
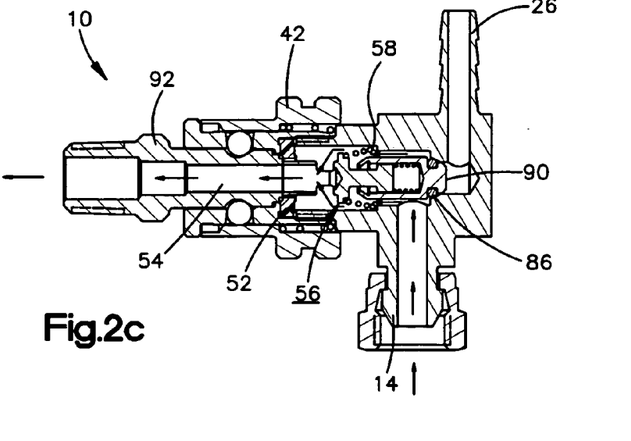
FIG. 2c illustrates the fluid diversion coupling of FIG. 2b upon the completion of the fluid diversion connection, resulting in the complete diversion of the fluid outlet flow.

In terms of operation of diversion valve fluid coupling 10, attention is now directed to FIGS. 2a–2c, with FIG. 2a, which is substantially similar to FIG. 2, basically illustrating the normal position or location of diverter valve assembly 56 within coupling housing 12. As may best be seen in FIG. 2, due to its increased scale, outer spring 76 normally biases actuating valve assembly 58 into a sealing relationship with seal member 52, thereby normally closing second or diverter outlet 54. At the same time, inner spring 90 biases opposing valve assembly 60 axially away from actuating valve assembly 58. Thus it should be clear that, in the FIG. 2a operative position, fluid flow is free to enter valve coupling central cavity 20 and freely exit therefrom via first outlet bore portion 26.

Advancing now to FIG. 2b, a hollow, generally tubular nipple 92, of well known construction, is being inserted into second outlet or diverter bore portion 54, with the nipple leading end face 94 physically axially touching, while concurrently but separately displacing outer sleeve 40 by manually retracting same (against the bias of spring 46), with the abutting end face of cylindrical portion 66 of actuating valve assembly 58, thereby laterally translating diverter valve assembly 56 inwardly or to the right. It should be understood that FIG. 2b illustrates diversion valve fluid coupling in a transitory state in which second outlet bore portion 54 is now partially unblocked, via the movement of actuating valve assembly center disc portion 64 away from sealing contact with seal member 52, thereby permitting the start of fluid flow onto second outlet portion 54. In addition, O-ring member 86, of opposing valve assembly 60, has just started to make contact with intermittent valve seat portion 24, thereby throttling and starting to cut off fluid flow into first outlet bore portion 26 into mating nipple 92.

Finishing now with FIG. 2c, it illustrates the now-completed full insertion of tubular nipple 92 into second outlet bore portion 54, in a manner well known in the art, which has further displaced actuating valve assembly 58 from seal member 52, thereby fully compressing not only outer biasing spring 76, but also inner biasing spring 90 which, in turn, has biased O-ring member 86 into full sealing engagement with valve seat portion 24, thereby sealing first outlet bore portion 26. It should also be clear at this time that normally-open first outlet bore portion 26 is now fully closed while second outlet bore portion is now fully open, with fluid flow freely entering, via inlet bore portion 14, into central cavity 20 and subsequently freely exiting therefrom via diverter outlet bore portion 54 into mating nipple 92. When nipple 92 is connected or meshed with quick disconnect coupler 32, internal valve spring 90 exerts a constant spring force upon opposing valve assembly 60. When nipple 92 is disconnected from quick disconnect coupler 32, external valve spring 76 closes actuating valve assembly 58 and thereby shuts off the fluid flow through quick disconnect coupler 32.

It will, of course, be understood by those skilled in the art that, while referring to one inlet port or inlet port portion, namely 14, and first and second outlet ports or outlet port portions, namely 26 and 54, respectively, in the previously-described embodiment, the fluid flow could be in any direction and thus the port functions could be changed or even reversed. In such occurrences, the operative description would be amended so as to recite which ports are in communication and which ports are not in communication. This same logic similarly applies to the several further embodiments that will be described hereinafter.

Figure 3:
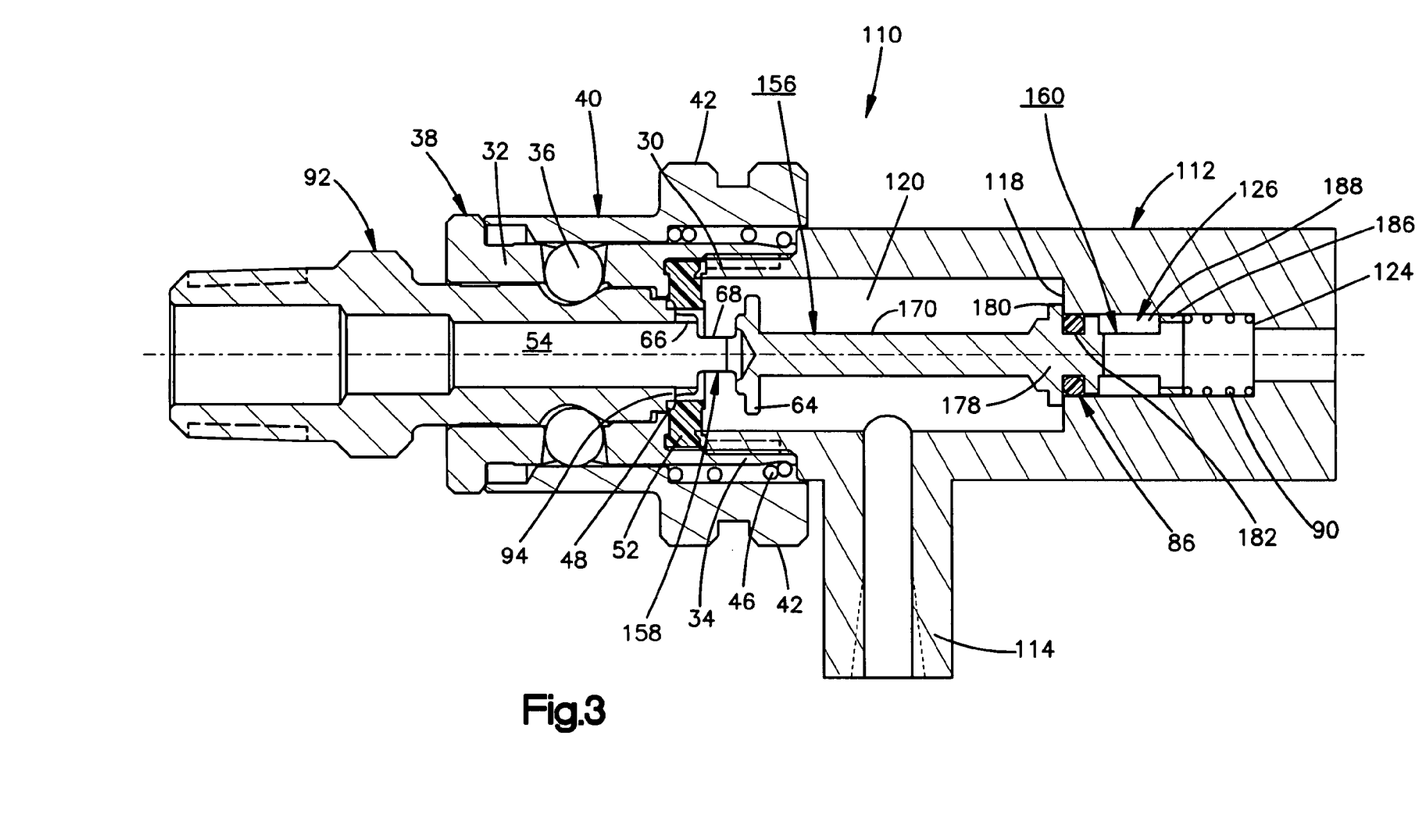
FIG. 3 is a longitudinal sectional view of a second embodiment of the diversion valve fluid coupling of this invention.

Advancing now to FIG. 3, there is shown a second embodiment of a diversion valve fluid coupling of this invention, generally indicated at 110, with FIG. 3 showing coupling 110 in the fluid diversion operating position. For ease of understanding, like or similar parts with first embodiment 10 will be denominated the same. Coupling 110, which also preferably is constructed mainly of nonferrous metal, includes a generally axially-directed housing 112 having a lower, generally central, cylindrical inlet port portion 114 whose inner end merges perpendicularly into an axially-extending central body cavity or bore 120. Bore 120 in turn merges, on one end, at step 118, into a normally-open or first outlet bore portion 126 having a shoulder step 124. The opposite end of bore 120 is provided with an externally threaded open-ended decreased diameter portion 30, having secured thereto, via a complementary threaded portion 34, quick disconnect coupler or ball body 32 with locking balls 36, as already previously described. Tubular outer sleeve 40 is normally biased, via spring 46, against coupler end ring portion 38. Similar to first embodiment 10, elastic annular seal 52 is captured between ball body inner end portion 48 and threaded portion 30.

Yieldingly retained, essentially within bore 120, is a unitary actuating valve assembly 156 comprised of two opposing valve geometries, namely a first valve assembly 158, at a first end, and a second or opposing valve assembly 160, at a second end of valve assembly 156, with valve assemblies 158 and 160 being connected via a central cylindrical connecting portion 170. Turning initially to first valve assembly 158, it is comprised of stepped center disc portion 64; a generally cylindrical, hollow, outer portion 66, having opposed recess or cut-out portions 68; and one end of axially extending cylindrical connecting portion 170. Disc portion 64, on one side, is adapted for sealing engagement with an adjacent side of elastic seal member 52, in the normal operating position (not illustrated here). Continuing now with second valve assembly 160, it is comprised, on one end, of another end of cylindrical connecting portion 170; a central multi-step disc portion 178 having a large diameter portion 180 that abuts body bore step portion 118 in the illustrated diversion operating position, and a peripheral groove 182 that houses toroidal seal member 86 which in turn is sealingly press-fitted into first outlet bore portion 126 in the illustrated diversion operating position. Second valve assembly portion 160 further includes a generally cylindrical, hollow, axial outer portion 186 having opposed recess or cut-out portions 188 adjacent to groove 182. Biasing spring 90, interposed between first outlet bore portion step 124 and valve assembly axial outer portion 186, normally biases actuating valve assembly 156 inwardly or to the left for sealing engagement of first valve center disc portion 64 with annular seal 52 in the normal operating position. Similar to first embodiment 10, housing bore 120, together with quick disconnect coupler 32 and tubular outer sleeve 40, defines the second or normally-closed diverter outlet portion 54.

In terms of the normal operation of diversion valve fluid coupling 110, fluid flows inwardly, via inlet port portion 114, into central bore portion 120 and freely exits therefrom through first outlet port portion 126 as a result of the biasing, via spring 90, of actuating valve assembly 156 into a sealing relationship with seal 52, thereby blocking second outlet bore portion 54, while opening first outlet bore portion 126. In terms of the fluid diversion connect sequence, it should be clear at this time that sleeve 40 is manually retracted (against the bias of spring 46) and nipple 92 is inserted into second outlet bore portion 54. The noted nipple insertion axially inwardly displaces actuating valve 156 thereby forcing O-ring member 86 into first outlet bore portion 126 and blocking same. Fluid flow, entering via inlet port portion 114 is now diverted through second outlet bore portion 54 into mating nipple 92.

Figure 4:
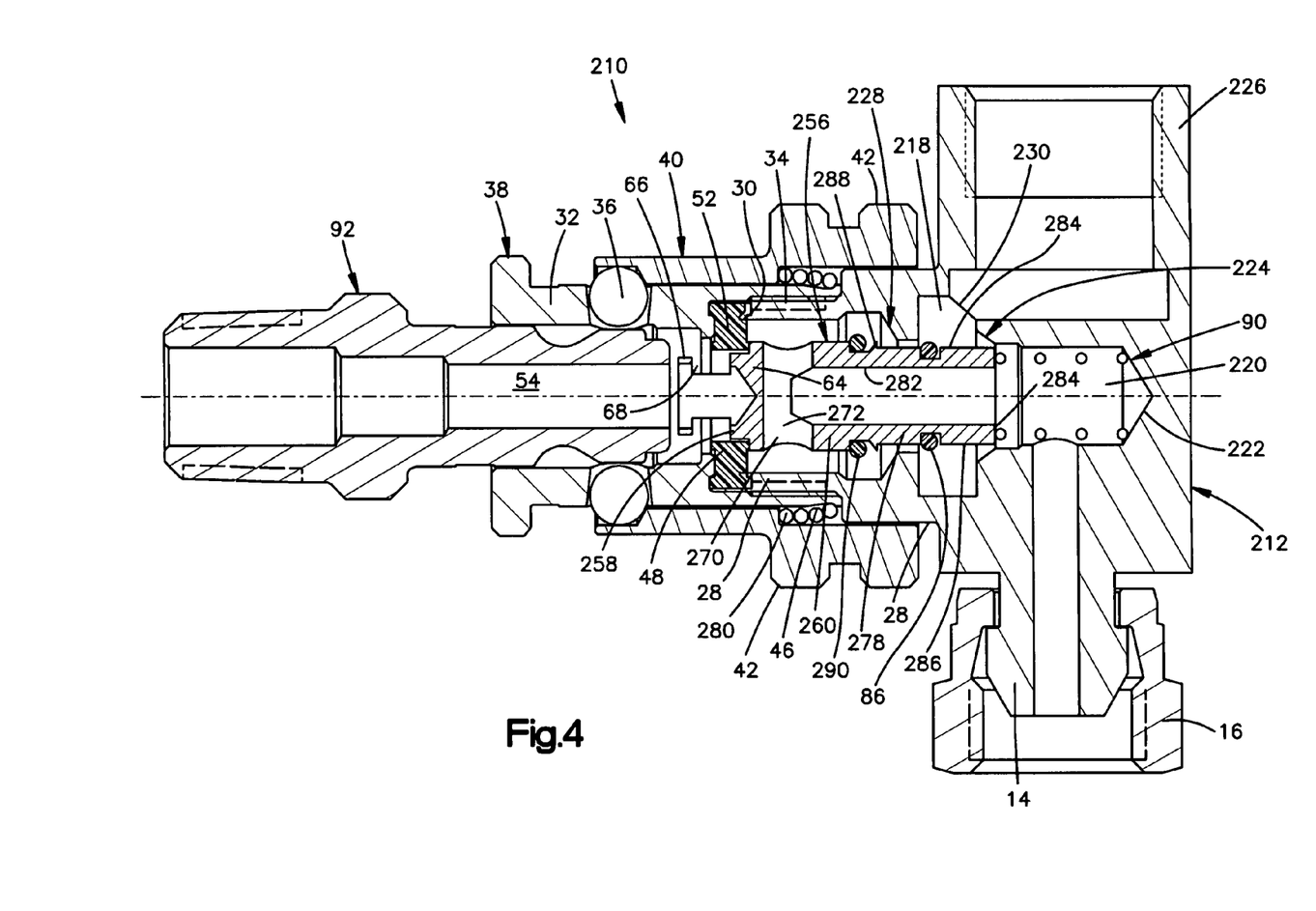
FIG. 4 is a longitudinal sectional view of a third embodiment of the diversion valve fluid coupling of this invention.
Figure 5:
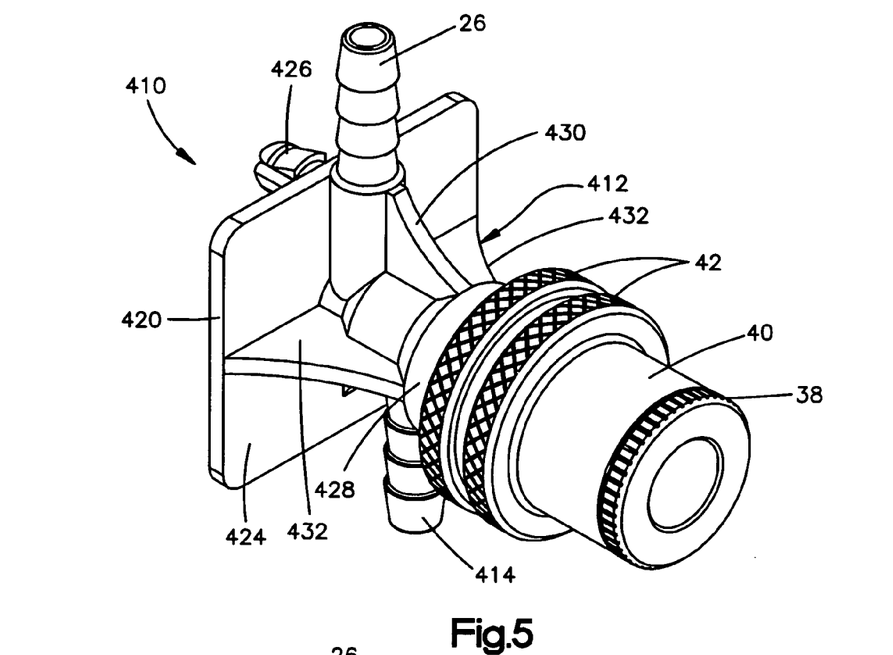
FIG. 5 is a perspective view of a further variation of the diversion valve fluid coupling of FIGS. 1 and 2.
Figure 5A:
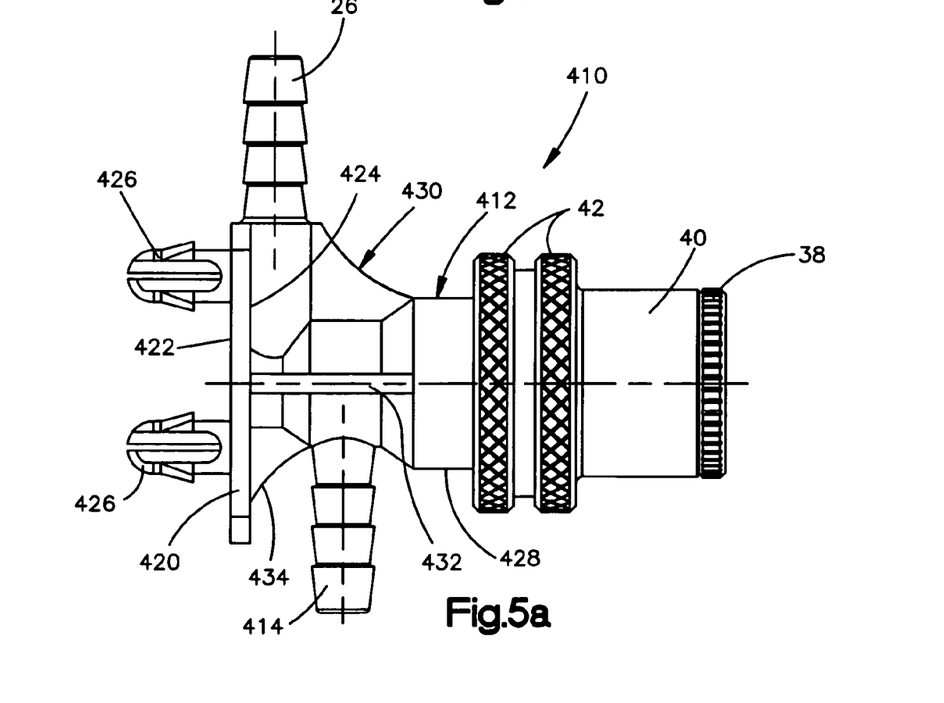
FIG. 5a is a side view of the diversion valve fluid coupling of FIG. 5.
Figure 5B:
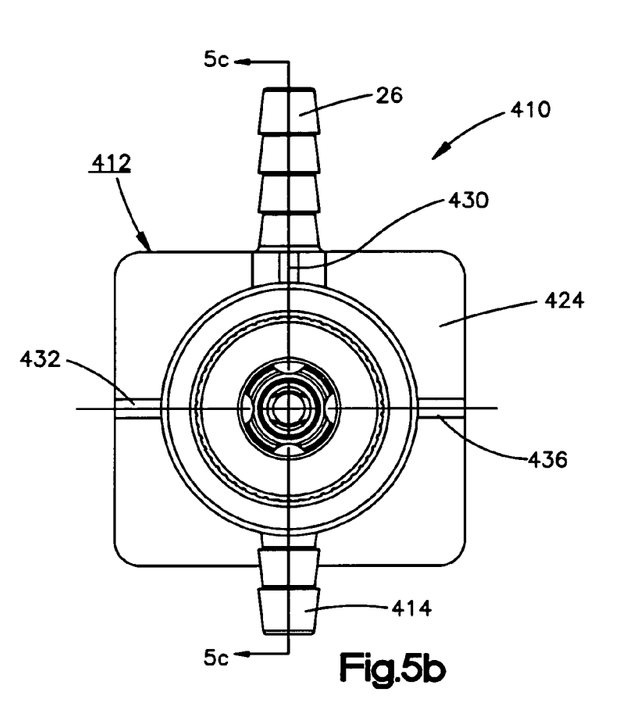
FIG. 5b is an end view of the open end of the diversion valve fluid coupling of FIG. 5.
Figure 5C:
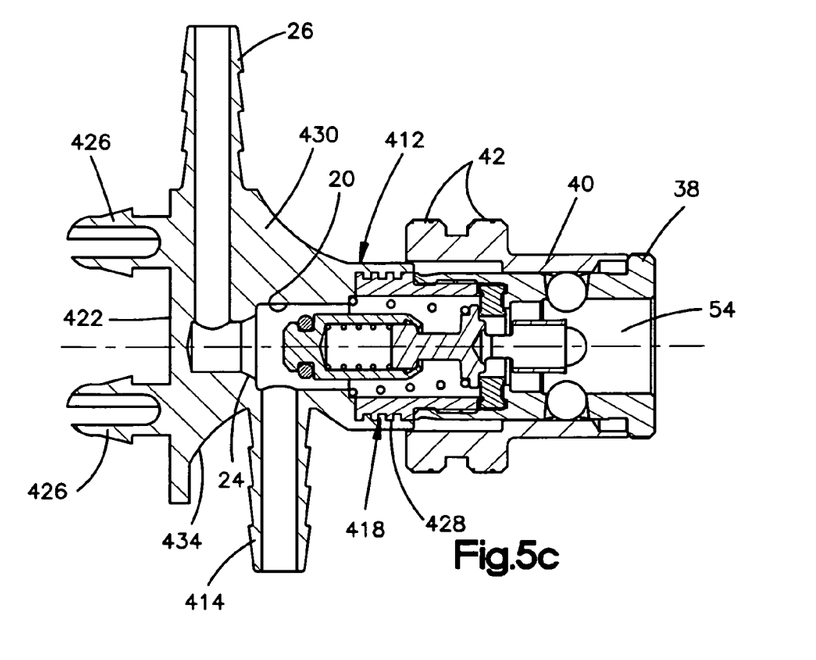
FIG. 5c is a longitudinal sectional view, taken along line 5c–5c of FIG. 5b.

Proceeding now to FIG. 4, there is shown a third embodiment of a diverter valve fluid coupling of this invention, generally indicated at 210, with FIG. 4 showing coupling 210 still in the normal operating position but with nipple 92 being in the process of being inserted into the coupling for subsequent fluid flow diversion upon the full insertion thereof. Again, for ease of understanding, like or similar parts with respective first and second embodiments 10 and 110, are denominated the same. Coupling 210, which is preferably also constructed mainly of nonferrous metal, includes a generally axially directed housing 212 having a lower generally cylindrical inlet port portion 14 with an internally-threaded, rotatable female coupling member 16. The radial inner end of inlet port portion 14 merges perpendicularly into an axially-extending, multi-step central body cavity or bore 220 having a proximate closed end 222. Bore 220 also includes a first or outer internal valve seat portion 224 and an axially adjacent diametrically enlarged, laterally open-ended chamber portion 218 which also merges generally diagonally, at diametral curved section 230 thereof, into a normally-open or first outlet bore portion 226 that is generally perpendicular to bore 220 and preferably coaxial with inlet bore portion 14.

Housing 212 also includes an internally multi-step, generally cylindrical, lateral portion 28 having an externally threaded, open ended, decreased diameter portion 30 having secured thereto, via a complementary threaded portion 34, quick disconnect coupler or ball body 32 with locking balls 36, as already described. Tubular outer sleeve 40 is normally biased, via spring 46, against coupler end ring portion 38. Similar to embodiments 10 and 110, elastic annular seal 52 is peripherally captured between ball body inner portion 48 and threaded portion 30. Housing lateral portion 28, which also includes a lateral portion of multi-step body cavity 220, is also provided with a second or inner internal valve seat portion 228 having a diameter larger that that of axially-spaced first valve seat portion 224.

Yieldingly retained within bore 220 is a unitary actuating valve assembly 256 comprised of two opposing valve geometries, namely a first valve assembly 258 at a first end, and a second or opposing valve assembly 260 at a second end, with valve assemblies 258, 260 being connected via a center connecting portion 270 having a radial through aperture 272. Turning initially to first valve assembly 258, it is comprised of a stepped, center disc portion 64; a generally cylindrical, hollow, outer portion 66, having opposed recesses or cut-out portions 68; and one end of axially-extending central connecting portion 270. Disc portion 64, on one side, is adapted for sealing engagement with an adjacent side of elastic seal member 52, in the normal operating position, as illustrated in FIG. 4.

Continuing now with second valve assembly 260, it is comprised, on one end, of another end of connecting portion 270 and a tubular lateral extension 278, having a multi-step external surface 280 and an internal, axially-directed cavity 282, one end of which merges into connecting portion radial aperture 272, while the other end opens into body cavity 220. Multi-step surface 280 is provided with a first groove 286, housing first toroidal seal member 86, and a second, larger diameter groove 288, housing a second toroidal seal member 290. Seal members 86, 290 are adapted to sealingly mate with valve seat portions 224, 228, respectively, in the fluid diversion operating position (not illustrated here). Biasing spring 90, interposed between body cavity closed end 222 and an axial outer end surface 284 of tubular extension 278, normally biases actuating valve assembly 256 laterally inwardly, or to the left, for sealing engagement of first valve center portion 64 with annular seal 52, in the normal operating position. Similar to embodiments 10 and 110, housing bore 220, together with quick disconnect coupler 32 and tubular outer sleeve 40, defines the second or normally-closed diverter outlet portion 54.

In terms of the normal operation of diversion valve fluid coupling 210, fluid flows radially inwardly, via inlet port portion 14, into central bore portion 220 and freely exits therefrom, via diametral curved section 230, into and through first outlet bore portion 226 as a result of the biasing, via spring 90, of actuating valve assembly 256 into sealing relationship with seal 52, thereby blocking second outlet bore portion 54, while opening first outlet bore portion 226. In terms of the fluid diversion connect sequence, it should be clear at this time that sleeve 40 is manually retracted (against the bias of spring 46) and nipple 92 is inserted into second outlet bore portion 54. The noted nipple insertion axially inwardly displaces actuating valve 256, thereby forcing O-ring members 86 and 290 into sealing relationships with valve seat portions 224 and 228, respectively, thus blocking fluid flow from entering first outlet bore portion 226.

Turning finally to FIGS. 5 and 5a–5c, illustrated therein is a variation 410 of first embodiment 10 (FIGS. 1 and 2). Diversion valve fluid coupling 410, which is shown in allochiral or mirror-image fashion, relative to coupling 10, basically utilizes a housing 412 which is produced from a thermoplastic material, such as polypropylene, instead of the nonferrous, such as brass, material utilized for housing 12 of coupling 10. A comparison of FIGS. 2 and 5c will show that all, but one, of the remaining valve components are substantially similar, with the sole exception being that coupling 410 utilizes an additional, tubular, externally crenellated brass insert 418 for forming and reinforcing a portion of the inner surface area of generally cylindrical, lateral body portion 428, as compared with unitary such portion 28 of FIG. 2. Both the normal and diverter operations of coupling 410 are substantially similar to that of coupling 10 and will thus not be repeated here.

Concentrating now specifically on thermoplastic housing 412, it is basically comprised of a generally rectangular base or mounting plate 420 having a rear surface 422 provided with two vertically-spaced one-way, multiple barbed plugs or prongs 426, adapted for plugging coupling 410 into corresponding apertures (not shown) for coupling mounting purposes. Integrally forming a part of a mounting plate front wall or surface 424 is a vertically upwardly directed, normally-open or first, generally-cylindrical, peripherally-barbed outlet port portion 26. First outlet port portion 26, which extends radially outwardly from and merges, on its inner end, into an adjacent end of body cavity or bore 20 of housing generally-cylindrical portion 428. Generally-cylindrical, peripherally-barbed inlet port portion 414 extends radially or perpendicularly outwardly from bore 20 and is axially-spaced or separated from first inlet port 26 via intermediate valve seat portion 24. Ports 26 and 414, while being axially offset, are preferably located in parallel planes and axes, but oppositely-directed.

First outlet port portion 26 is structurally interconnected with housing cylindrical portion 428 by means of a vertically upwardly-extending, generally triangular-shaped top reinforcing or stiffening rib 430. Two horizontally opposed, axially-extending further, generally triangular-shaped side reinforcing ribs 432 serve to connect base plate 420 with housing portion 428. Finally, a vertically downwardly-extending fourth or bottom reinforcing rib 434 serves to connect base plate 420 with housing portion 428 in the general area of inlet port portion 414. Preferably, reinforcing ribs 430, 432 and 434 are equally angularly spaced. Among the advantages for utilizing thermoplastic housing 412 are: reduced weight, lower manufacturing costs, ease of mounting and corrosion resistance.

It is deemed that one of ordinary skill in the art will readily recognize that the several embodiments of this invention fill remaining needs in this art and will be able to affect various changes, substitutions of equivalents and various other aspects of the invention as described herein. Thus, it is intended that the protection granted hereon be limited only by the scope of the appended claims and their equivalents.

What is claimed is:

1. A diversion valve fluid coupling, for permitting alternate fluid flow operating positions, comprising in combination:

a valve housing, having an inlet port portion and spaced first and second outlet portions, all of said port portions being connected via a housing central cavity, said first outlet port portion including an annular valve seat;

an annular quick disconnect coupling mechanism attached to said housing second outlet portion;

an annular static elastomer seal member interposed between said housing second outlet portion and said quick disconnect coupling member;

an axially movable diverter valve assembly, comprised of operatively interconnected actuating and opposing valve assemblies, located within said housing central cavity, said actuating valve assembly, being adapted, in a first operating position, for a first sealing engagement with an adjacent annular side portion of said static elastomer seal member; said opposing valve assembly, being adapted, in a second operating position, for a second sealing engagement with said first outlet port portion annular valve seat;

a biasing member, located within one of said housing central cavity and said first outlet port portion, for biasing said diverter valve assembly into said first sealing engagement, thereby blocking said second outlet port portion and concomitantly permitting fluid flow only from said inlet port portion into and through said first outlet port portion in said first operating position; and for said second operating position, a removable nipple member, adapted for removably mating with said annular quick disconnect coupling member and, upon full insertion thereof, axially abutting and translating said diverter valve assembly, against the force of said biasing member, into said second sealing engagement, thereby blocking said first outlet port portion and concomitantly permitting fluid flow only from said inlet port portion into and through said second outlet port portion, wherein said actuating valve assembly includes:

a. an intermediate disc portion;

b. on one side of said disc portion, an adjoining reduced diameter, generally-cylindrical, hollow, abutment portion, having spaced, peripheral, relief areas for permitting fluid flow, from said housing central cavity, into the inside of said abutment portion, with the outside diameter of said abutment portion being sized for a freely sliding relationship relative to the inside diameter of said static elastomer seal member; and c. on an opposite side of said disc portion, a first piece of a connecting portion, said connection portion being operatively interconnected with said opposing valve assembly.

2. The diversion valve fluid coupling of claim 1, wherein said opposing valve assembly includes:
   a. on a side, facing said actuating valve assembly, a second piece of said connecting portion;
   b. a distal end portion, connected with said second piece of said connecting portion; and
   c. an elastomeric toroidal seal, carried by said distal end portion, adapted for forming said second sealing engagement with said first outlet portion annular valve seat.

3. The diversion valve fluid coupling of claim 2, wherein said opposing valve assembly second piece of said connecting portion includes a generally tubular portion that slidably confines a distal end of said first piece of said connecting portion; said opposing valve assembly also including a further biasing member, located within said generally tubular second piece of said connecting portion, for biasing said connection portion first end distal portion axially away from said opposing valve.

4. A diversion valve fluid coupling, for permitting alternate fluid flow first and second operating positions, said coupling comprising:
   a valve housing, having an inlet port portion and spaced first and second outlet port portions, all of said port portions being connected via a housing central cavity, said first outlet port portion including an annular valve seat;
   an annular quick disconnect coupling mechanism attached to said housing second outlet portion;
   an annular static elastomer seal member interposed between said housing second outlet portion and said quick disconnect coupling member;
   an axially movable diverter valve assembly, comprised of operatively interconnected actuating and opposing valve assemblies, located within said housing central cavity, said actuating valve assembly, being adapted in said first operating position, for a first sealing engagement with an adjacent annular side portion of said static elastomer seal member: said opposing valve assembly being adapted in said second operating position, for a second sealing engagement with said first outlet port annular valve seat;
   a biasing member, located within said housing central cavity, for biasing said diverter valve assembly into said first sealing engagement, thereby blocking said second outlet port portion while, at the same time permitting fluid flow only from said inlet port portion into and through said first outlet port portion;
   for said second operating position, a removable nipple member, adapted for removably mating with said quick disconnect coupling member and, upon full insertion thereof, axially abutting and translating said diverter valve assembly, against the force of said biasing member, into said second sealing engagement, thereby blocking said first outlet port portion while, at the same time, permitting fluid flow only from said inlet port portion into and through said second outlet port portion,
   wherein said actuating valve assembly including an intermediate disc portion; on one side of said disc portion, an adjoining, reduced diameter, generally-cylindrical, hollow, abutment portion, having spaced, peripheral, relief areas for permitting fluid flow, from said housing central cavity, into the inside of said abutment portion, with the outside diameter of said abutment portion being sized for a freely sliding relationship relative to the inside diameter of said static elastomer seal member; and on an opposite said of said disc portion, a first piece of a connecting portion, said connecting portion being operatively, but yieldingly connected with said opposing valve assembly; and
   said opposing valve assembly including, on a side facing said actuating valve assembly, a second piece of said connecting portion; connected with said second piece of said connecting portion; and an elastomeric toroidal seal, carried on said distal end portion, for forming said second sealing engagement with said outlet portion annular valve seat.

5. The diversion valve fluid coupling of claim 4, wherein said opposing valve assembly connecting portion second piece includes a generally tubular portion that slidably confines a distal end of said connecting portion first piece; said opposing valve assembly also including a further biasing member, located within said tubular portion, for biasing said connection first portion axially away from said opposing valve.

* * * * *